US010656933B2

(12) United States Patent
Radermacher et al.

(10) Patent No.: US 10,656,933 B2
(45) Date of Patent: May 19, 2020

(54) ZERO DOWNTIME FOR FREQUENT SOFTWARE UPDATES

(71) Applicant: SAP SE, Walldorf (DE)

(72) Inventors: Ralph Radermacher, Bad Schoenborn (DE); Martin Mayer, Heidelberg (DE); Thomas Ullrich, Stutensee (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 168 days.

(21) Appl. No.: 15/471,550

(22) Filed: Mar. 28, 2017

(65) Prior Publication Data

US 2018/0285097 A1  Oct. 4, 2018

(51) Int. Cl.
| | |
|---|---|
| *G06F 8/656* | (2018.01) |
| *G06F 16/22* | (2019.01) |
| *G06F 16/23* | (2019.01) |
| *G06F 16/27* | (2019.01) |
| *G06F 16/21* | (2019.01) |

(52) U.S. Cl.
CPC .......... *G06F 8/656* (2018.02); *G06F 16/2282* (2019.01); *G06F 16/213* (2019.01); *G06F 16/23* (2019.01); *G06F 16/27* (2019.01)

(58) Field of Classification Search
CPC .......... G06F 8/65–66; G06F 17/30345–30383; G06F 17/30575–30584; G06F 16/23–2393; G06F 16/27; G06F 16/278; G06F 16/213; G06F 16/2282
USPC ........................... 717/168–173; 707/610–639
See application file for complete search history.

(56) References Cited

U.S. PATENT DOCUMENTS

| | | | |
|---|---|---|---|
| 7,523,142 B2 | 4/2009 | Driesen et al. | |
| 7,805,423 B1 * | 9/2010 | Romine | G06F 17/30607 707/638 |
| 8,413,130 B2 * | 4/2013 | Madduri | G06F 21/572 717/168 |
| 9,262,148 B2 * | 2/2016 | Thompson | G06F 8/65 |
| 9,563,519 B2 * | 2/2017 | Vollmer | G06F 8/658 |
| 10,311,077 B2 * | 6/2019 | Specht | G06F 16/258 |
| 2009/0094462 A1 * | 4/2009 | Madduri | G06F 21/572 713/182 |
| 2012/0143819 A1 * | 6/2012 | Tan | G06F 17/30569 707/626 |
| 2013/0067454 A1 * | 3/2013 | Thompson | G06F 8/65 717/173 |

(Continued)

*Primary Examiner* — Todd Aguilera
(74) *Attorney, Agent, or Firm* — Klarquist Sparkman, LLP

(57) ABSTRACT

In order to perform relatively frequent, zero-downtime software updates, a bridge schema corresponding to an original schema of a database system may be generated. Within the bridge schema, a plurality of views corresponding to a plurality of database tables of an application executing on an application server may be generated. A connection from the application to the original schema may be changed to the bridge schema, to thereby continue executing the application using the plurality of views. When a change file defining update changes to at least one original database table of the plurality of database tables is received, content of the at least one original database table may be synchronized with a target table reflecting the update changes. Then, the connection may be changed back to the original database schema to continue executing the software application, using the plurality of database tables and including the target table.

20 Claims, 14 Drawing Sheets

(56) References Cited

U.S. PATENT DOCUMENTS

| | | |
|---|---|---|
| 2013/0238868 A1 | 9/2013 | Driesen et al. |
| 2014/0258234 A1* | 9/2014 | Michels ............ G06F 17/30309 |
| | | 707/638 |
| 2014/0279928 A1* | 9/2014 | Vollmer .................. G06F 8/658 |
| | | 707/679 |
| 2015/0106140 A1 | 4/2015 | Biewald et al. |

* cited by examiner

200

Generate a bridge schema corresponding to an original schema of a database system, the original schema including a plurality of database tables and having a connection to an application server and being used by a software application executing on the application server
202

Generate, within the bridge schema, a plurality of views corresponding to the plurality of database tables
204

Change the connection to the bridge schema and continue executing the software application using the plurality of views
206

Receive a change file defining update changes to at least one original database table of the plurality of database tables
208

Synchronize content of the at least one original database table with a target table, the target table reflecting the update changes
210

Change the connection back to the original database schema and continue executing the software application, using the plurality of database tables and including the target table
212

FIG. 2

ZERO DOWNTIME FOR FREQUENT SOFTWARE UPDATES

TECHNICAL FIELD

This description relates to techniques for updating software.

BACKGROUND

Software users often desire or require uninterrupted availability and operation of software systems. For example, providers of business software may have customers using the software on an ongoing basis, or may require the software in order to interact with their customers in a desired fashion. In these and other scenarios, it may be inconvenient and unprofitable for software users to experience interruptions or other downtime in software operation.

At the same time, it is also true that software users may need to upgrade, maintain, or otherwise update their software. Although it is possible to implement such updates by stopping some or all operations of the software being updated, such techniques conflict with the above-referenced need to avoid interruptions to the operations of the software.

Some update techniques have been developed in which a copy is made of some or all of the software being updated, so that one version of the software continues to run while the other is updated, and so that a change-over can be executed essentially all at once when the update is complete. Such techniques may require non-trivial amounts of time to complete the copying and updating processes, and may require system experts to administer (e.g., to perform testing, and/or in case an error occurs). Thus, such techniques may be suitable, for example, for large, infrequent changes to sizable software systems that are managed by experts in the updating process.

In many cases, however, day-to-day software users, or other non-expert users, may wish to provide relatively small, relatively frequent changes to their software system(s). In these and similar cases, the lengthy runtimes of existing update techniques may be undesirable or unacceptable, even when system downtime is avoided.

SUMMARY

Techniques are provided for enabling zero downtime imports of update changes to software applications. The techniques enable fast, targeted updates, which are fully revocable in case of error or failure. Consequently, such updates may be executed fairly frequently, without disrupting an overall operation of the software application(s) being updated.

The details of one or more implementations are set forth in the accompanying drawings and the description below. Other features will be apparent from the description and drawings, and from the claims.

BRIEF DESCRIPTION OF THE DRAWINGS

FIG. 2 is a flowchart illustrating example operations of the system of FIG. 1.

DETAILED DESCRIPTION

Figure 1:
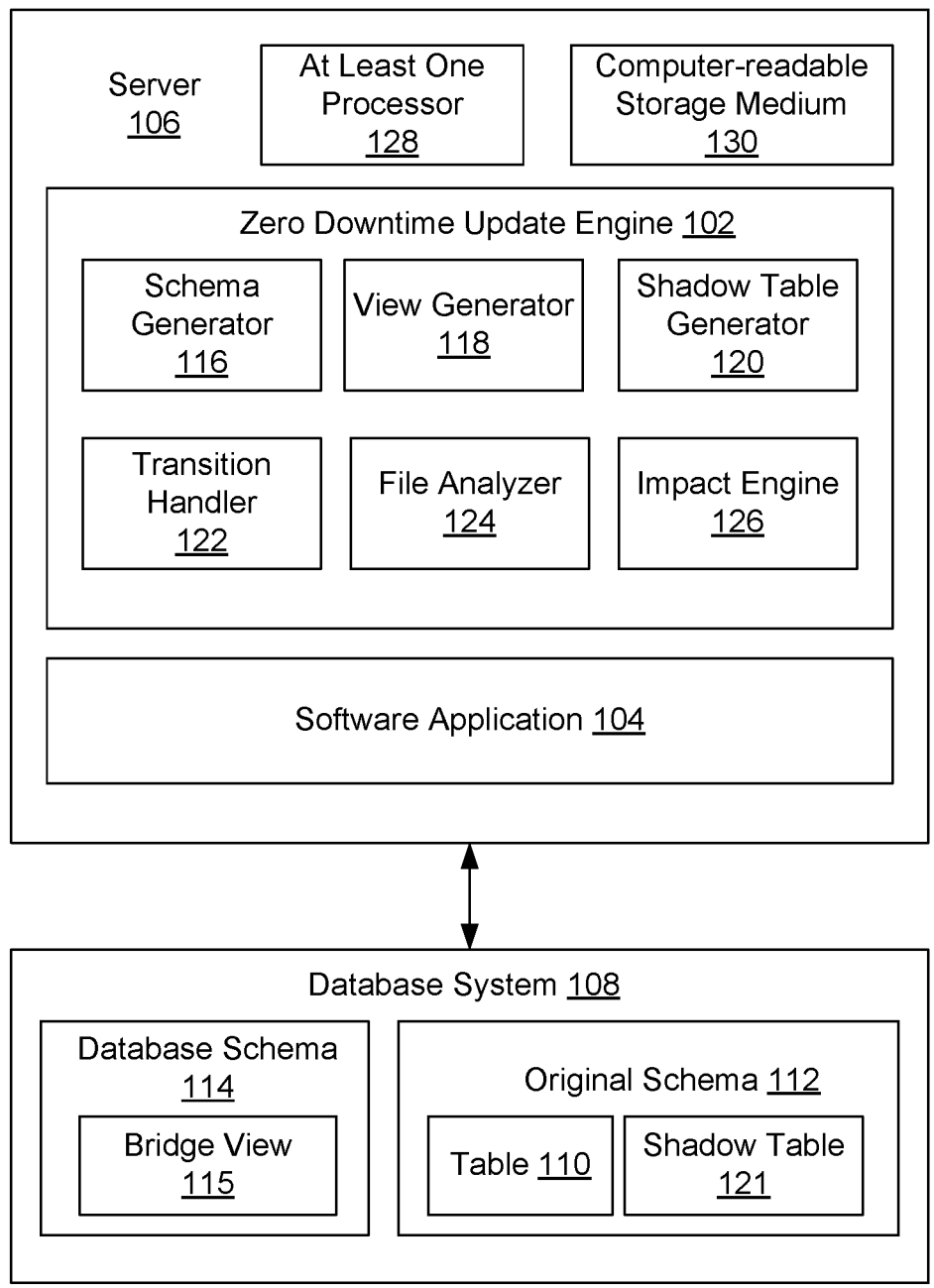
FIG. 1 is a block diagram of a system for zero downtime software updates for frequent software updates.

FIG. 1 is a block diagram of a system 100 for zero downtime software updates for frequent software updates, using a zero downtime update engine 102 (also referred to herein as update engine 102). The system 100 of FIG. 1 enables a user to update currently-executing software, without interrupting the executing operations of the software. The described techniques are suitable, for example, when providing relatively small updates, on a relatively frequent basis.

For example, the techniques do not require lengthy runtimes, for at least the reason that such lengthy runtimes would conflict with the need for frequent updates. For example, two consecutive update runtimes, if overly lengthy relative to the frequency of the updates, might overlap with one another, such as when conventional runtimes last for a period of days, but the updates may occur multiple times per week.

Further, the described techniques do not require extensive or wholesale copying (e.g., cloning) of the software/system being updated. The described techniques may be executed by a system administrator, rather than by a software update expert. Moreover, the described techniques are very robust, because any errors that may occur may be corrected and/or revoked in an automated fashion with a high degree of success, so that the software may continue executing regardless of the outcome of the update procedures.

In FIG. 1, the update engine 102 is illustrated and described as updating a software application 104 executing on an application server 106. As will be appreciated, and as may be observed from the non-limiting examples provided herein, the software application 104 may represent virtually any suitable software that would benefit from updates performed by the update engine 102. For example, the application 104 may include a business software application, such as an application for management of inventory, supply chain(s), or customers, or an application for enterprise resource planning, to name a few examples. Of course, more generally, the software application 104 may represent virtually any relevant commercial application, as well as, e.g., a gaming, educational, non-profit, or governmental application. The software application 104 may be accessed remotely by a large number of users. An administrator of the software application 104 may desire to make various types of updates, configuration changes, extensions, or other changes to the software application 104.

In operation, the application server 106 utilizes a database system 108 to provide and enable the application 104, using stored data. For example, as in the examples above, the database system 108 may include database table(s) 110, which may be used to store, e.g., inventory data records, customer data records, employee data records, or any data records storing data usable by the application 104.

In more detail, for example, the application 104 may include application logic for reading (or deleting) data from the database tables 110, executing data analysis or data-based transactions, and/or writing data (back) to the database tables 110. In this way, the application 104 may provide its intended functions to a user (not shown in FIG. 1), using current, up-to-date data.

In the present description, described zero downtime software updates refer generally to any software maintenance, upgrade, or other change to operations of the application 104, including changes to the database system 108, which have a goal of completely avoiding any interruption, or at least any noticeable interruption, to the operations of the application 104. For example, when making structural or content changes to the database tables 110 during an update process, the update engine 104 ensures that such changes are not visible to the application 104, until the changes are confirmed as being complete and correct, at which point the update engine 102 is able to seamlessly switch operations of the application 104 to the resulting, updated database table(s) 110.

It is possible to accomplish these or similar goals by executing a large-scale or wholesale copying of the database tables 108, making necessary changes to the resulting, copied database tables, and then switching to the resulting, copied database tables. However, these and similar techniques, as referenced above, tend to be relatively long-running, particularly for large-scale software applications and associated database tables.

In the example of FIG. 1, the update engine 102 may be configured to provide relatively fast, frequent updates, e.g., by updating only (or primarily) those database tables (or portions thereof) that require changes. Moreover, as described in detail below, the update engine 102 allows continuous execution of the software application 104 while the database table updates are occurring, followed by a switch to the resulting, updated database tables once the updates have completed.

In more detail, as shown in FIG. 1, the database system 108 may operate using an original database schema 112, according to which the database table 110 is constructed, implemented, and utilized. As is known, a database schema in general may simply refer to a logical organization or structure of the tables of the database system 108, defining a manner in which the data is organized, and including relationships between the data. A schema may be defined during a data modelling process(es), in which a formal schema language is used. Many different techniques for implementing database schemas would be apparent to one of skill in the art, and are therefore not described here in further detail, except as may be necessary or helpful in understanding operations of the system 100 of FIG. 1.

In the example of FIG. 1, a bridge schema is illustrated, which, as described below, mirrors the original schema 112. As also illustrated, the bridge schema includes a table view, which is also referenced (by virtue of being associated with the bridge schema 114) as a bridge view 115, which corresponds to the table 110. In general, of course, the database system 108, including the original schema 112, may include thousands or even millions of tables, of varying types and characteristics, and the single table 110 is illustrated as such merely for the sake of simplicity and conciseness. Nonetheless, it will be appreciated that the bridge schema 114 may be generated as corresponding to the original schema 112, and including a corresponding view for every table in the original schema 112.

In more detail, a database view in this context should be understood to represent at least one defined query on a table which, in FIG. 1, is constructed to essentially provide a mirror of the corresponding table, in terms of table structure and content. Thus, the bridge view 115 represents a searchable portrayal of data of the underlying database table 110. The bridge view 115 may be constructed within the bridge schema 114 using any appropriate command(s) of a database/query language of the database system 108, e.g., a SELECT statement.

In operation, the bridge schema 114 may thus be generated by a schema generator 116, while the bridge view 115 may be generated by a view generator 118. More detailed examples of operations of the schema generator 116 and the view generator 118 are provided below, e.g., with respect to FIG. 4. In general, it will be appreciated that the bridge view 114 and the bridge schema 114, in the context of the update engine 102, allow the application 104 to operate on the table 110, while insuring that changes to the table 110 that are part of the update being performed are invisible to the software application 104 (and users thereof), until the new or target version/data associated with the update being performed are reflected in the table 110 and ready for use. Moreover, the changes are fully revocable until the update is ready and verified for use.

A shadow table generator 120 may be configured to generate a shadow table 121 for the (original) table 110. The shadow table may share characteristics of the table 110, while also including additional or alternative structural elements. For example, as described below, the shadow table 121 may include a new column, which may be referred to as a shadow column. The shadow table 121 is invisible to the application 104, and the application 104 may continue to function using the original table 110, while changes to the original table 110 that result from these operations of the application 104 may be reflected in the shadow table 121.

The bridge schema 114, the bridge view 115, and the shadow table 121, in some implementations, may be partially or completely generated or pre-generated prior to an actual, specific import of a particular update. The update engine 102 may be installed and designed for permanent or semi-permanent setup within the system 100, thereby allowing for faster deployment times during imports of updates, as well as shorter runtimes of the updates themselves. For example, the shadow table 121 may be created for certain (types of) database tables (e.g., repository tables, as described below). Somewhat similarly, create and delete statements for the bridge view 115 may be computed prior to a specific update being conducted (and associated bridge view(s) being instantiated).

During a specific import procedure of a specific update, a transition handler 122 may be configured to execute a change in the connection of the application 104 from the original schema 112 to the bridge schema 114, as described and illustrated below with respect to FIG. 4. The transition handler 122 may be configured to copy the contents of the original table 110 to the shadow table 121, and install a database trigger to maintain synchronization between the tables 110, 121 (e.g., to update the shadow table 121 with new data when new data is inserted into the table 110 via the bridge view 115).

The specific update being deployed may be received from the system administrator, e.g., as a change file, at a file analyzer 124, which may identify necessary changes to the shadow table 121 by analysing the change file. That is, since the tables 110, 121 represent many different tables and types of tables, the file analyzer 124 may be configured to analyze the received change file and identify specific tables or table types that will be affected by the update. As described below, such changes may include content changes, structural changes to tables, or data migration(s), to name a few examples. Thus, the shadow table 121 may be understood to represent, or be modified to obtain, a target table that includes the desired structure, form, or content associated with the import to be executed.

An import engine 126 may be configured to execute the import, based on the operations of the file analyzer 124. For example, the import engine may be configured to update the structure or content of the shadow table 121.

The import engine 126 may be configured to execute a switch from the original table 110 to the shadow table 121. Using one or more bridge views, e.g., including the bridge view 115, as a layer of abstraction, the import engine 126 may be configured to rename the shadow table 121 with the original name of the original table 110 (while essentially maintaining the connection of the application 104 to the original table 110 through the bridge view 115). In this way, once the update is complete and the shadow table 121 reflects the desired changes, it is then possible to execute a straightforward connection change for the application 104 from the bridge schema 114 back to the original schema 112, including deleting the original table 110 and proceeding with the re-named shadow table 121 as the target table.

In this way, the update engine 102 completes the update and is able to revert back to a ready condition for a subsequent update. In this ready condition, the subsequent updates may be initiated with minimal preparation work, and completed quickly.

Finally with respect to FIG. 1, the update engine 102 is illustrated as being executed using the server 106, which itself includes at least one processor 128 and a non-transitory computer readable storage medium 130. For example, the server 106 may represent one or more computing devices configured to implement the update engine 102 by causing the at least one processor 128 to access corresponding instructions stored using the non-transitory computer readable storage medium 130.

Of course, as is apparent, the server 106 is intended as a highly simplified representation of the types of computing devices that may be utilized to provide the update engine 102, and therefore does not explicitly illustrate various known hardware/software components that may be utilized in the various implementations of the system 100. For example, the server 106 does not explicitly illustrate, but could utilize, a monitor or other appropriate display device, network-related hardware/software for enabling network communications between the various components of the update engine 102 and/or the database system 108, as needed, and various other input/output and other human interface components.

For example, two or more computing devices, or one or more computing devices having two or more processors each, may execute individual components of the update engine 102, perhaps in parallel. Further, although the update engine 102 is illustrated as including a number of separate, discrete components, it will be appreciated that any two or more components or sub-components may be combined for operation of the single component, while, conversely, a single component may be operated as two or more separate sub-components.

FIG. 2 is a flowchart 200 illustrating example operations of the system 100 of FIG. 1. In the example of FIG. 2, operations 202-212 are illustrated as separate, sequential operations. In various implementations, additional or alternative operations or sub-operations may be included, and/or one or more operations or sub-operations may be omitted. In all such implementations, any two or more operations or sub-operations may be executed in a partially or completely overlapping or parallel manner, or in a nested, iterative, looped, or branched fashion.

In the example of FIG. 2, a bridge schema corresponding to an original schema of a database system is generated, the original schema including a plurality of database tables and having a connection to an application server and being used by a software application executing on the application server (202). For example, the schema generator 116 of FIG. 1 may be configured to generate the bridge schema 114 corresponding to the original schema 112 of the database system 108 of FIG. 1. In practice, the database system 108 may have a plurality of original schemas, in which case the schema generator 116 may be configured to generate a corresponding plurality of bridge schemas.

Within the bridge schema, a plurality of views corresponding to the plurality of database tables may be generated (204). For example, the view generator 118 of FIG. 1 may be configured to generate the bridge view 115 for the table 110.

The connection may be changed to the bridge schema, and execution of the software application may continue, using the plurality of views (206). For example, the transition handler 122 may be configured to switch the connection of the software application 104 from the original schema 112 to the bridge schema 114. Accordingly, users of the software application 104 may continue to use the software application 104, without necessarily having knowledge or awareness of the abstraction layer provided by the bridge schema 114 and the bridge view 115. Further, no change to the software application 104 itself is required.

A change file defining an update change to at least one original database table of the plurality of database tables may be received (208). For example, the file analyzer 124 may be configured to receive a file containing one or more update changes. The file analyzer 124 may analyze the received change file and identify at least the original database table 110 from among a potentially large number of original database tables as being identified within the change file with respect to a change in content or structure of the database table 110.

Content of the at least one original database table may be synchronized with a target table, the target table reflecting the update change (210). For example, the import engine 126 of FIG. 1 may be configured to synchronize content of the table 110 with a shadow table 121. As referenced above, and described in detail below, depending at least in part on the type of update change and/or type of database table, the shadow table 121 may be generated at least partially during a preparation phase that occurs prior to the actual generations of the bridge schema 114 and the bridge view 115, in order to minimize a time needed for deploying the update change in question. In other examples, the shadow table 121 may not be generated until after the file analyzer 124 identifies required changes from the change file.

In some implementations, as referenced above and described in detail below, the content may be synchronized including copying content from the table 110 to the shadow table 121, as needed, and then utilizing a database trigger so that changes made to the table 110 via the bridge view 115 are automatically reflected within the shadow table 121. Further, as also referenced above and described in detail below, the import engine 126 may be configured to execute a switch in a name of the shadow table 121 and the table 110, so that the shadow table 121, as the target table, is provided with the original name of the original database table 110. Various techniques may be utilized to accomplish this or a similar objective, as described below, so that the software application 104 may continue working in an original name space of the original schema 112, even though the original database tables have been updated.

Specifically, the connection may be changed back to the original database schema, and the software application may continue executing, using the plurality of database tables including the target table (212). For example, with reference to FIG. 1, the connection between the software application 104 may be switched from the bridge schema 114 back to the original schema 112. If the shadow/target table 121 has had its name switched to the original name of the original table 110, then the software application 104 may continue to execute using the original schema 112, without any further changes to the software application 104 or the table 121 being required.

At this point, various cleanup procedures may be executed, such as deleting the bridge schema 114, the bridge view 115, and the original database table 110. In some implementations, various preparation steps also may be taken to prepare the system 100 for any future, subsequent update changes that may be received, as described in detail below.

Figure 3A:
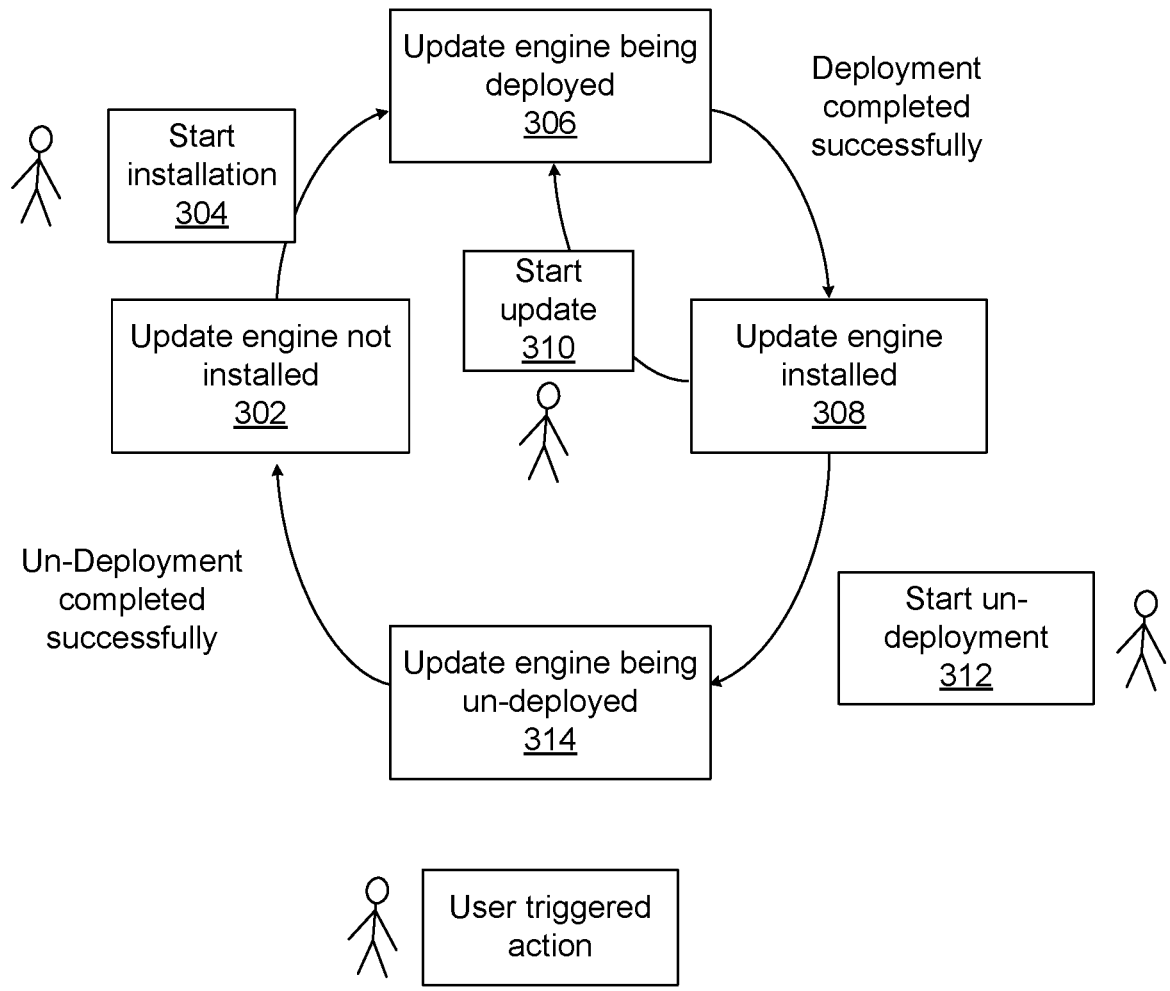
FIG. 3A is a flowchart illustrating deployment state transitions that may occur when deploying and installing the zero downtime update engine 102 of FIG. 1.

FIG. 3A is a flowchart illustrating deployment state transitions that may occur when deploying and installing the zero downtime update engine 102 of FIG. 1. In the example of FIG. 3A, the process starts in a state in which the update engine 102 is not installed. After an administrator starts an insulation process (304), the update engine is deployed (306). Deployment may occur in conjunction with a new installment of the update engine 102, or in conjunction with a new/updated version of the update engine 102 (310).

Once deployment is completed successfully, installation may begin (308). In general, installation refers to insulation of all software and metadata content needed to execute the update engine 102. Installation may include reference to, or use of, internal or external tools available at the system 100, such as, e.g., structure analyzer or trigger generator tools. During insulation, a file system directory structure may be created, and associated operating system (OS) tools may be installed therein. The OS tools may then read any configuration files from this file system directory structure, and write their logs thereto. In some implementations, metadata tables may be created within the database system 108. The metadata tables may hold their configuration for how individual databases or types of databases will be processed during update procedures.

Finally in FIG. 3A, if an administrator starts an undeployment process (312), then the update engine 102 may be undeployed (314), i.e., removed from the system 100. For example, the update engine 102 may be removed in scenarios in which further updates are not anticipated in the near future, or as part of an upgrade process for the update engine 102.

Figure 3B:
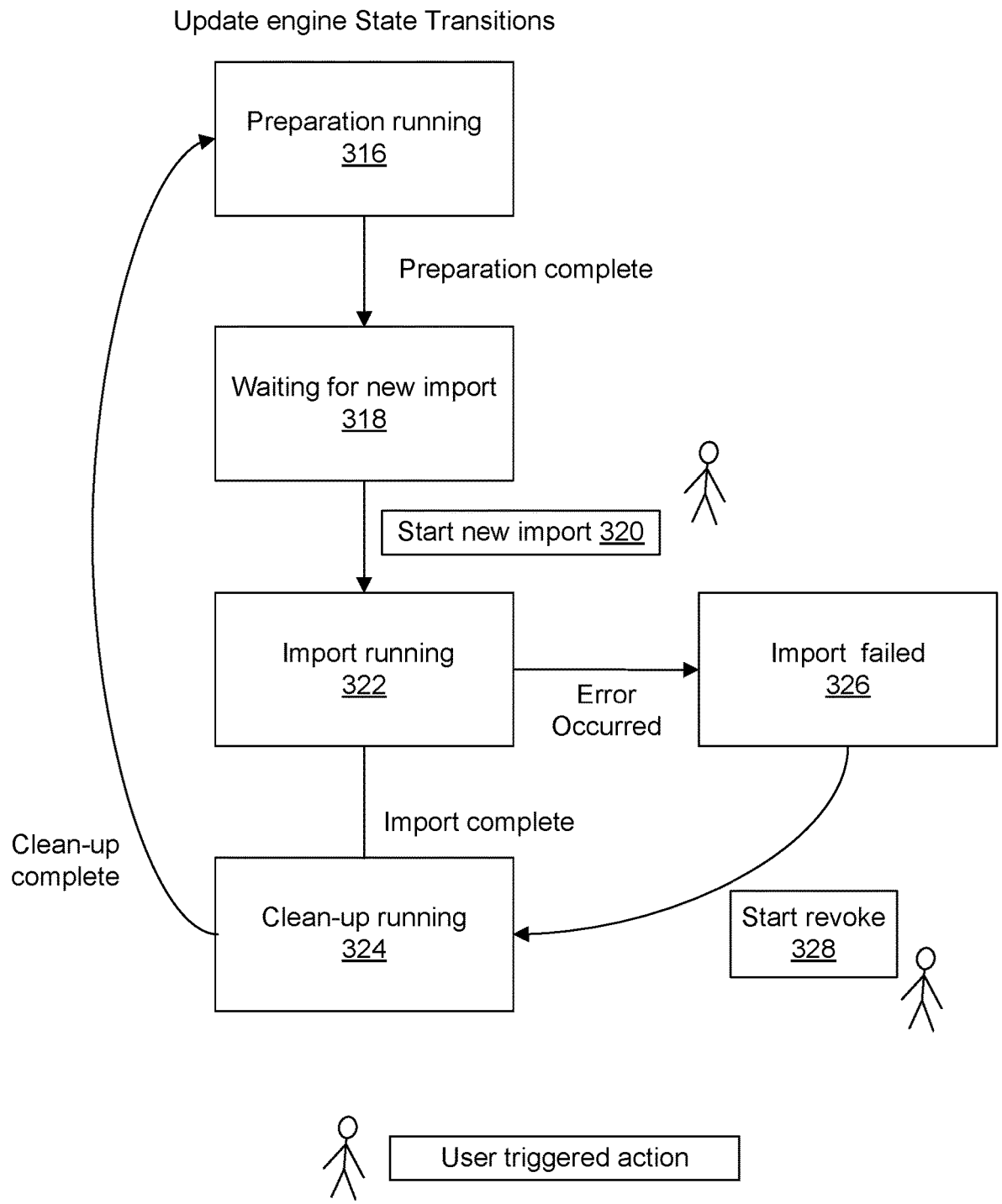
FIG. 3B is a flowchart illustrating state transitions for operation/procedures of the update engine 102.

FIG. 3B is a flowchart illustrating state transitions for operation/procedures of the update engine 102. That is, while the update engine 102 is in the installed state (308) of FIG. 3A, it may be utilized to deploy one or more changes to one or more software applications, such as a bundle of customer extensions or configurations.

In the example of FIG. 3B, as referenced above, it is an advantageous feature of the system 100 to minimize a lead time necessary to initiate import of a new update to the software application 104. Accordingly, FIG. 3B includes a preparation state 316 in which steps are taken to prepare for any new import that may be received. Detailed examples of such preparation procedures are described below, in connection with FIGS. 4-6. In general, however, such preparation steps may include creating shadow tables for certain types or classes of database tables (e.g., repository tables), or computing create/delete statements for views that are anticipated to be generated during import procedures.

Once preparation is complete, the system 100 may be in a state of waiting for any new import to be received (318). That is, in the state 318, an administrator may trigger the start of a new, desired import (320), and transition the update engine 102 into a state 322 in which the import may execute. Additional detailed examples of operations that may occur during the state 322 are provided below, e.g., with respect to FIGS. 6-12. If a second request for a second import is received during the state 322, the second request may be suspended until the update engine 102 has again reached the state 318 of waiting for a new import.

After successful completion of the new import during the state 322, cleanup operations may proceed (324). Examples of cleanup procedures are described below, with respect to FIG. 13. In general, it will be appreciated that database artifacts that are no longer needed may be removed. Further, the update engine 302 may be configured to reset any temporary status information and otherwise prepare the system 100 for facilitating further preparation operations during a return to the state 316.

If the import procedure experiences an error and the import enters a failed state 326, then the import procedure will stop and a revoke procedure will be started 328. As referenced above and described in more detail below, the system 100 may be altered back to its original state, using specific revoke procedures followed by normal cleanup operations during the state 324. That is, as referenced above and described in detail below, the system 100 is configured for the software application 104 to continue executing using the bridge schema 114, while any new shadow or target table is invisible to the software application 104. Consequently, it is straightforward to delete any such shadow/target table, and any associated schema or view, without interruption to operations of the software application 104.

FIGS. 4-13, as referenced above, illustrate block diagrams and associated operations demonstrating example implementations of the flowchart of FIG. 3B. In the examples of FIGS. 4-13, the following terminology and associated notations may be used.

Specifically, a term shadow table should be understood to include one or more tables created in conjunction with each table of the database system 108 that, e.g., receives new content, has a change in a database key, or experiences insertions or deletions of data entries in conjunction with one or more data migration programs. As referenced above and described below in detail, it is possible that a shadow table may be created, at least in part, in conjunction with preparation activities of the update engine 102, and may subsequently be modified or created during execution of a particular import process. Each shadow table is typically provided with a different name than its corresponding, original table. In the following examples, shadow tables are named by adding a "_shd" to the name of the corresponding, original table.

It is also possible to have a shadow field, e.g., a shadow column, of a particular table. For example, when only a single column is added to a table as part of an import process, it may be more efficient to include only a shadow column for the table in question, rather than reproducing content of the entire table. Field alterations may include, e.g., a type change, or content modification. As with the shadow table, a shadow field will not be seen by, or used by, the executing software application 104. In the following examples, shadow fields are named by adding a "_shd" to the name of the corresponding field.

As referenced, it may be efficient or otherwise advantageous to treat different database tables of different categories or types in manners that are suited to, or take advantage of characteristics of, the various types of tables. By way of illustration of this point, the following examples use the following categories of tables. For example, repository tables may refer to a set of tables containing reports, classes, table definitions, user interface (UI) objects, as well as compiled runtime objects of these objects (e.g., report loads, class load, or table definition runtime objects).

Configuration tables refer to tables containing data for customizing the system in question. Default customizations may be provided by the vendor, but administrators, developers, and users also may add their own configuration tables.

Application tables may also be used, in which no content is deployed, but existing content may be processed. Application tables may be treated differently during the various deployment procedures, depending on the change/processing required.

For example, application tables may have structural changes, in which the same database key is used, but new fields are added or inserted. Application tables may have data content updates, in which the same database key is used, but longer fields or changed field types may be used. These application tables might also include application tables associated with the data migration including only update entries.

Other application tables may be associated with insertions of data content, or deletions of data content. For these application tables, a new database key may be used. These application tables may be associated with data migration programs that involve insert and delete entries.

Figure 4:
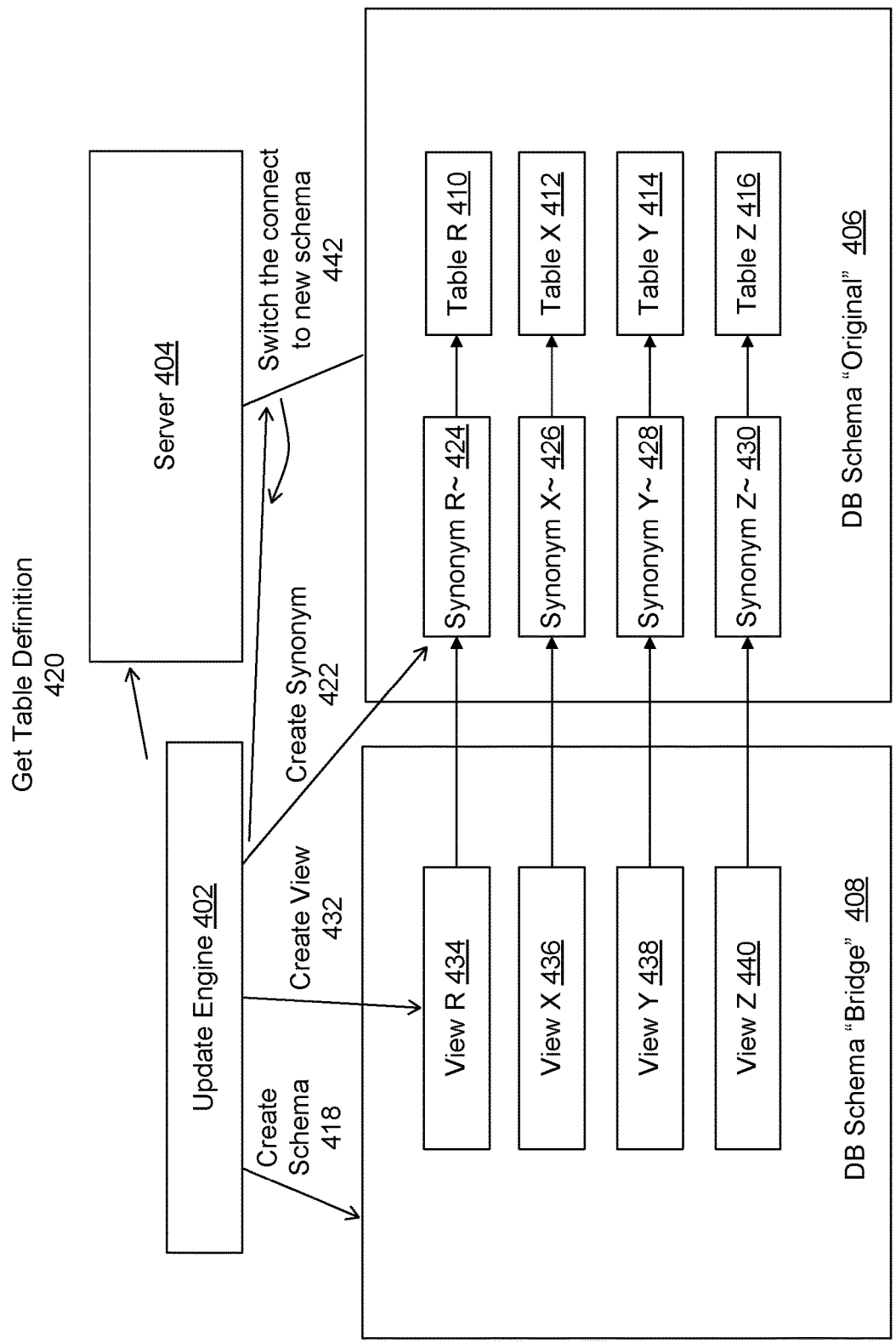
FIG. 4 is a block diagram illustrating example operations for preparing for a future import operation.
Figure 5:
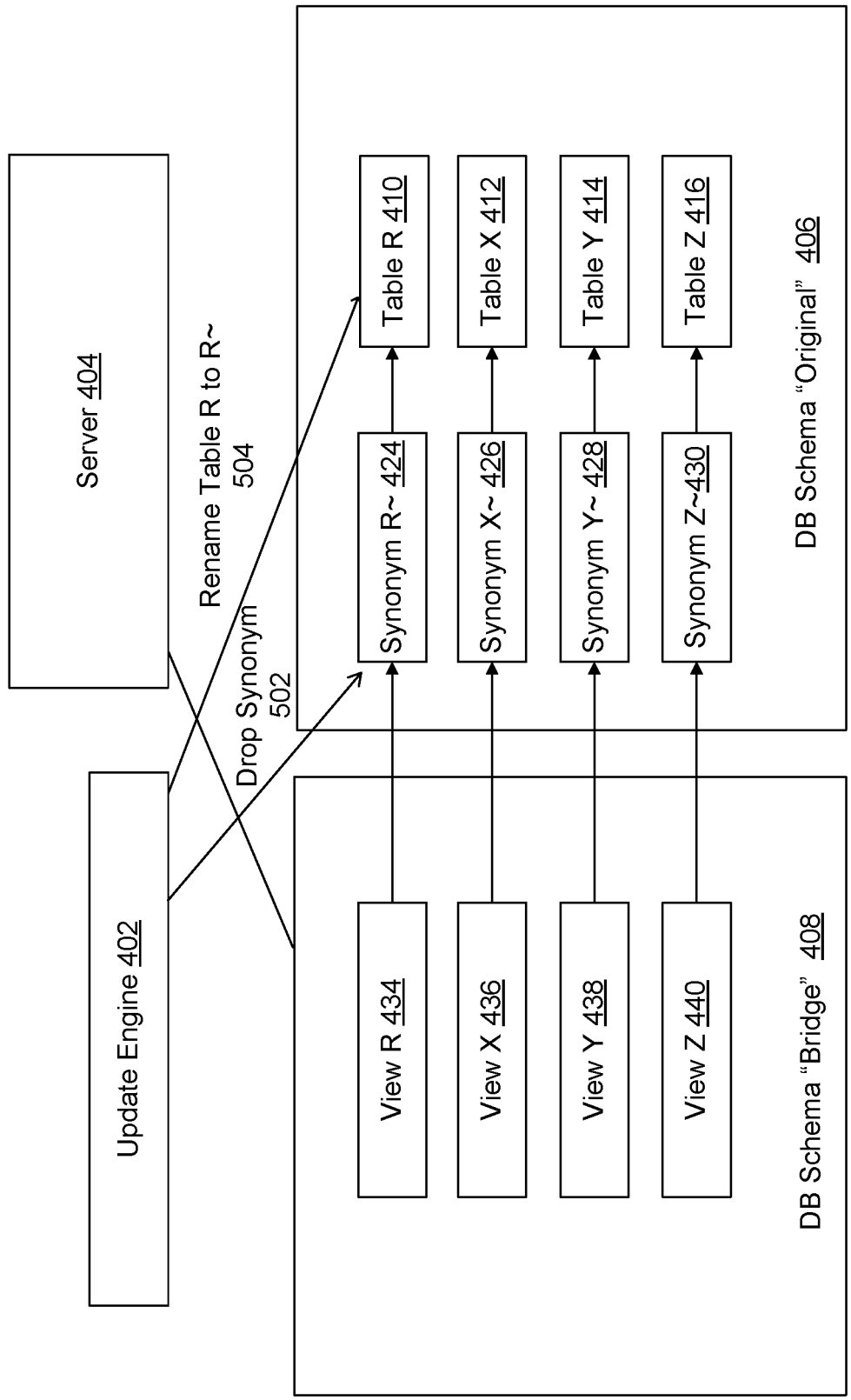
FIG. 5 is a block diagram illustrating further example operations for preparing for a future import operation.
Figure 6:
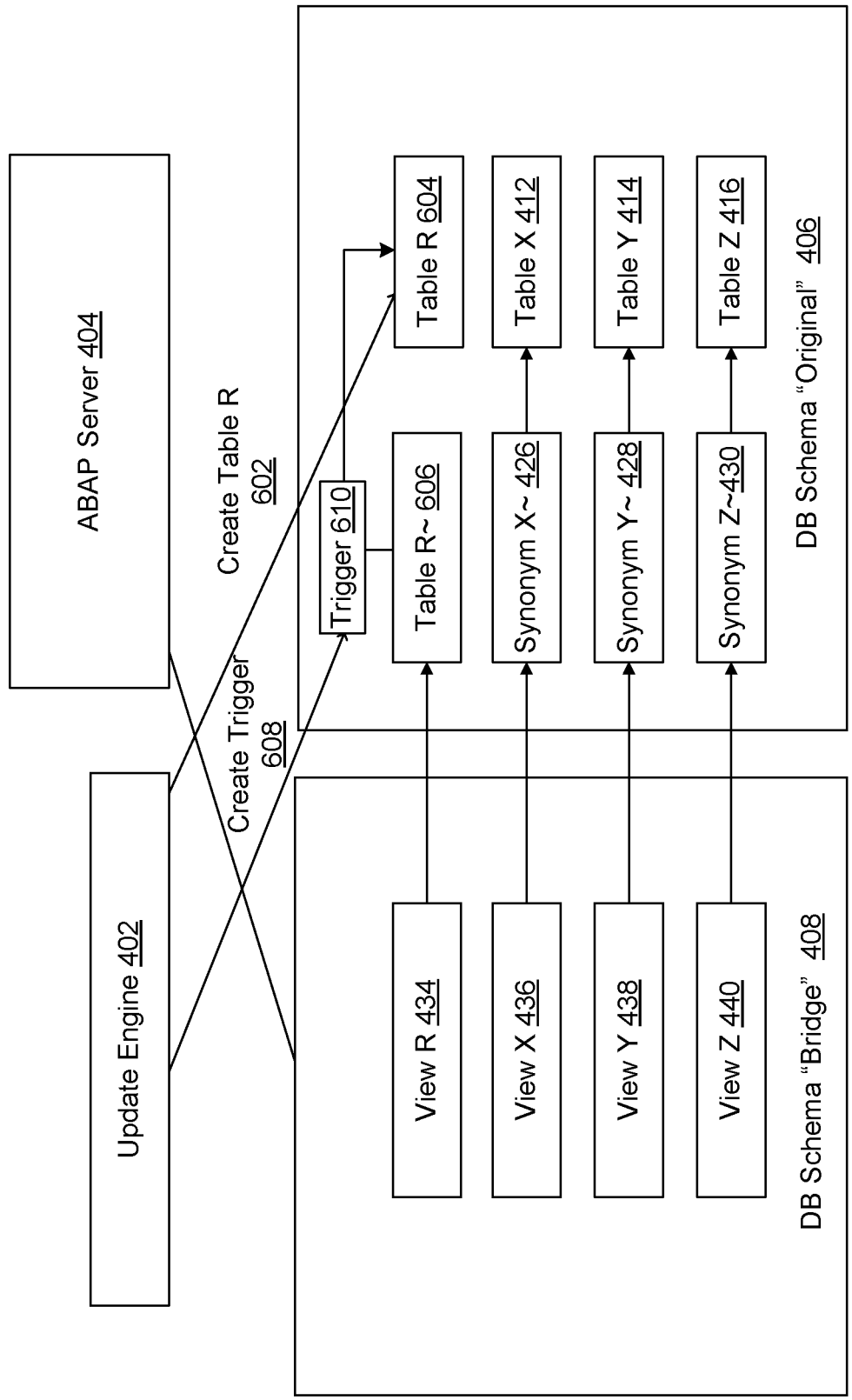
FIG. 6 is a block diagram illustrating resulting operations of FIG. 5, along with final preparation steps in advance of one or more future imports.

As referenced, the preparation state 316 of FIG. 3B references preparation operations included within the illustrations of FIGS. 4-6, in which various actions are taken that are largely generic to one or more potential future imports/updates, and which prime the system for executing any such imports in a fast and efficient manner.

Of course, it will be appreciated that, in various implementations, the type, degree, and extent of preparation activities may vary. For example, it could occur that the system 100 may execute an import process using the update engine 102 and without performing any operations in advance of a particular deployment being received. In other implementations, more extensive preparation activities may be performed, potentially with the risk that at least some of the preparation activities will not be useful or helpful in conjunction with a particular deployment, but with the intent of reducing an overall deployment time for a group of deployments. Consequently, it will be appreciated that some of the operations of FIGS. 4-6 may be executed as part of a preparation state in some example implementations, while being included during the import execution state 322 of FIG. 3B in other implementations.

In the example of FIG. 4, an example update engine 402 is illustrated as interacting with a server 404. An original database schema 406 is further illustrated in conjunction with a corresponding bridge schema 408. As shown, the original schema includes example tables 410, 412, 414, 416.

In operation, the update engine 402 may begin preparation activities by creating the bridge schema 408 (418). The update engine 402 may then retrieve table definitions for the tables 410-416 from the server 404 (420). The update engine 402 may then be configured to create corresponding bridge views (432) for the tables 410-416, illustrated as corresponding bridge views 434, 436, 438, 440. In some implementations, the update engine 402, at this stage, may compute create and delete statements for the bridge views 434-440, or for other views that may be necessary, and then create the actual, corresponding database view during the execution of a specific import.

In the example of FIG. 4, the table R 410 represents a repository table. Specifically, as referenced above, the table R 410 may represent a code repository table, so that all (or many) changes being imported will likely result in at least some associated changes within the table R 410. Consequently, for all tables of the type/category repository, the table may be preemptively copied to a shadow table, where the shadow table, as referenced above, for a table of the name "name" will have a name "name_shd" to indicate its status as a shadow table.

In some implementations, a "freeze trigger" may be used to protect the system from errors. Specifically, for example, particular create/delete statements may be computed to provide such freeze triggers, by ensuring that no changes may be performed on tables that do not have shadow tables, and/or that are read-only.

As referenced above, target tables that are ultimately created as part of a particular import of update changes may have their names changed to match corresponding names of corresponding, underlying original database tables. As described, in this way, it is straightforward for the server 404 to continue using the target tables after the import has completed.

As also referenced, various techniques may be used to change the name of a given target table in an efficient manner(s). In the example of FIG. 4, the update engine 402 creates synonyms (422) illustrated as synonyms 424, 426, 428, 430 corresponding respectively to tables 410, 412, 414, 416.

The example uses of the synonyms 424-430 in renaming target tables is described below. In general, it will be appreciated that a database synonym in the context of FIGS. 4-13 refers generally to an alternate name for a corresponding database table.

Finally in the example of FIG. 4, the update engine 402 may proceed to switch the connection of the server 404 from the original schema 406 to the bridge schema 408 (442). As may thus be observed from the example of FIG. 4, the relevant software application executing on the server 404 may continue to execute, while interacting with each of the database tables 410-416 by way of the corresponding, respective views 434-440, and corresponding, respective synonyms 424-430.

FIG. 5 is a block diagram illustrating further example operations for preparing for a future import operation. Specifically, in the example of FIG. 5, further details are provided with respect to the use of the synonym 424. As shown, the synonym 424 is initially named (R~), and in FIG. 5, the update engine 402 proceeds to drop the synonym 420 (502), and rename the table 410 (named R) to the name of the synonym 424 (i.e., R~).

FIG. 6 is a block diagram illustrating resulting operations of FIG. 5, along with final preparation steps in advance of one or more future imports. Specifically, as shown, the table R~ 606 illustrates results of the operations 502, 504 of FIG. 5. As a result of the described processes, the view 434 is correct with respect to the table R~ 606. As referenced herein, other techniques may potentially be used to obtain a same or similar result. For example, it may be possible to rename the original table R table to R~, drop the view R434, and create a new view with the renamed table R~. However, the technique of FIGS. 4-6 provides an efficient technique for obtaining the desired result, and is applicable in many different circumstances.

For example, as described herein, the update engine 402 may proceed to create a target table (602), e.g., table R 604. As shown, the table R604 has the same name as the original table, now renamed as table R~ 606. Accordingly, although the created target table 604 may be updated with any desired content or structure changes, the server 404 will be able to read from the table 604 after the conclusion of the update and import processes described herein, without any further changes to the server 402 being required, other than, e.g., switching the connection of the server 404 back from the bridge schema 408 to the original schema 406.

Moreover, continuing with the example of FIG. 6, the server 404 may proceed to execute the relevant software application executing thereon, using the view R 434 to indirectly utilize the table R~ 606. That is, as may be observed, from the point of view of the server 404, the target table R 604 is effectively invisible, even though the server 404 may continue to execute the relevant software application using the table R~ 606. For example, it is straightforward for the server 404 to read data from the table R~ 606 for use in executing the software application.

Further, in scenarios in which the server 404 is required to, e.g., update content based on user actions or other operational aspects of the executing software application, the update engine 402 may be configured to create a database trigger (608), illustrated as trigger 610 in the example of FIG. 6, in order to synchronize content of the tables 606, 604. For example, data written to the table R~ 606, or deleted therefrom, would trigger, via the trigger 610, corresponding updates or deletions within the target table 604.

Figure 7:
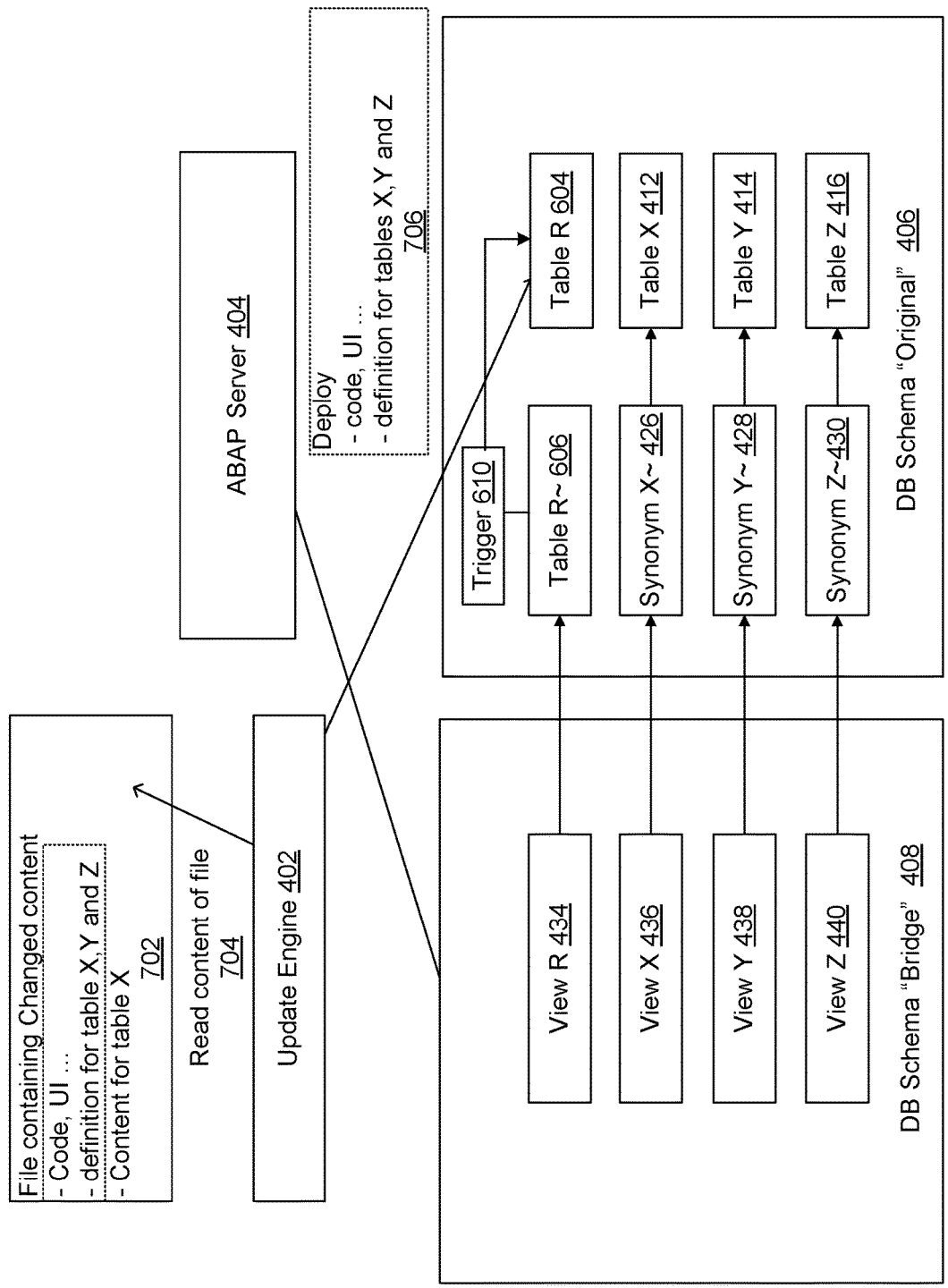
FIG. 7 is a block diagram illustrating example operations associated with deployment of specific update changes being imported.

FIG. 7 is a block diagram illustrating example operations associated with deployment of specific update changes being imported. Specifically, a file 702 containing the desired changes is received. As shown, the update engine 402 may be configured to read the contents of the file 702 (704), and may proceed to deploy the read content (706).

More specifically, for example, as may be appreciated from the above description of FIG. 1, the update engine 402 may be configured to import a data dictionary definition to the target repository of table R 604, in which the data dictionary definition describes the target structure of the one or more database tables that will be updated as part of the particular import process.

As also referenced with respect to FIG. 1, the update engine 402 may be configured to analyze the received changes. For example, for structural changes, a corresponding database table may require alteration in structure to reflect a desired target state. For content deployment, the database table in question may be updated with content, e.g., records may be inserted, updated, or deleted. In the example of data migration programs, data may be migrated in a table, such as when existing records are updated, or such as when data records are updated, and also inserted or deleted.

For each database table, corresponding behavior during the deployment and import procedures may be computed according to the examples illustrated below in Table 1:

TABLE 1

| Change | Description | Action |
| --- | --- | --- |
| Structure change | | |
| New fields | Additional fields to be added to the table | Shadow field |
| Changed field types | e.g. int to float, varchar to clob | Shadow field |
| Changed key | e.g new key field | Shadow table |
| Dropped fields | | Late deletion of field |
| Content change | | |
| Data insert, update, delete | | Shadow table |
| Data migration | | |
| Update of fields only | | Shadow field |
| Insert or delete of records | | Shadow table |

In some cases, it may occur that a single table receives two or more of a structural change, content change, and/or data migration. In these scenarios, the corresponding required action will be "shadow field" from Table 1 if all actions for each change are "shadow field," but will be "shadow table" if at least one action for one of the changes is "shadow table."

Figure 8:
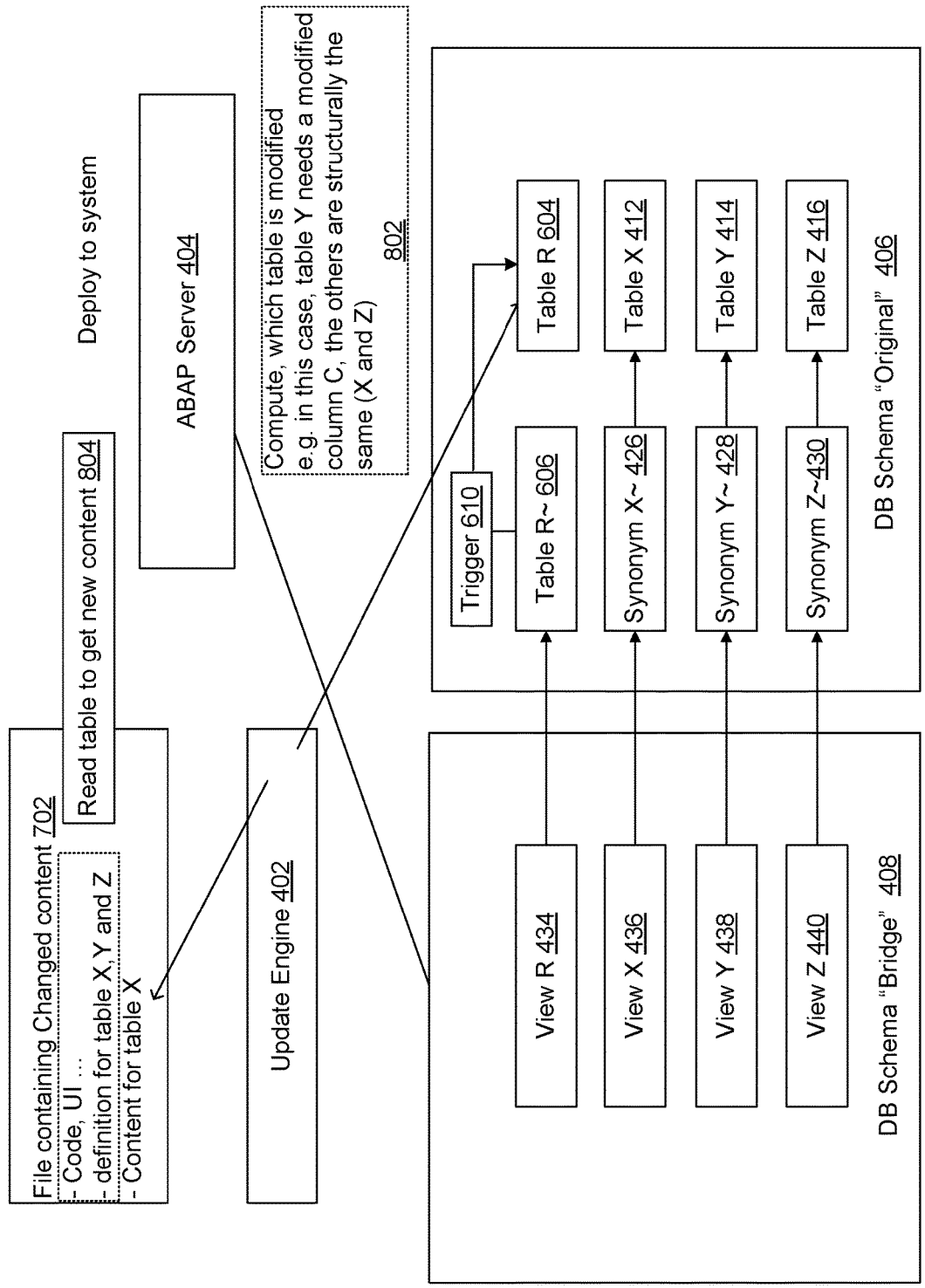
FIG. 8 is a block diagram illustrating further example operations of the import operations of FIG. 7.

FIG. 8 is a block diagram illustrating further example operations of the import operations of FIG. 7. As shown, the update engine 402 may be configured to compute one or more tables requiring modification (802). In the following examples, it is assumed that the table Y414 will require a modified column C, as described in more detail below with respect to FIG. 10, while remaining tables, table X412 and Z416 will remain structurally the same as before the deployment in question.

The update engine 402 may then proceed to read each target table (804), in order to retrieve the new content. For example, as shown, the update engine 402 may be configured to read content for the table X 412.

Figure 9:
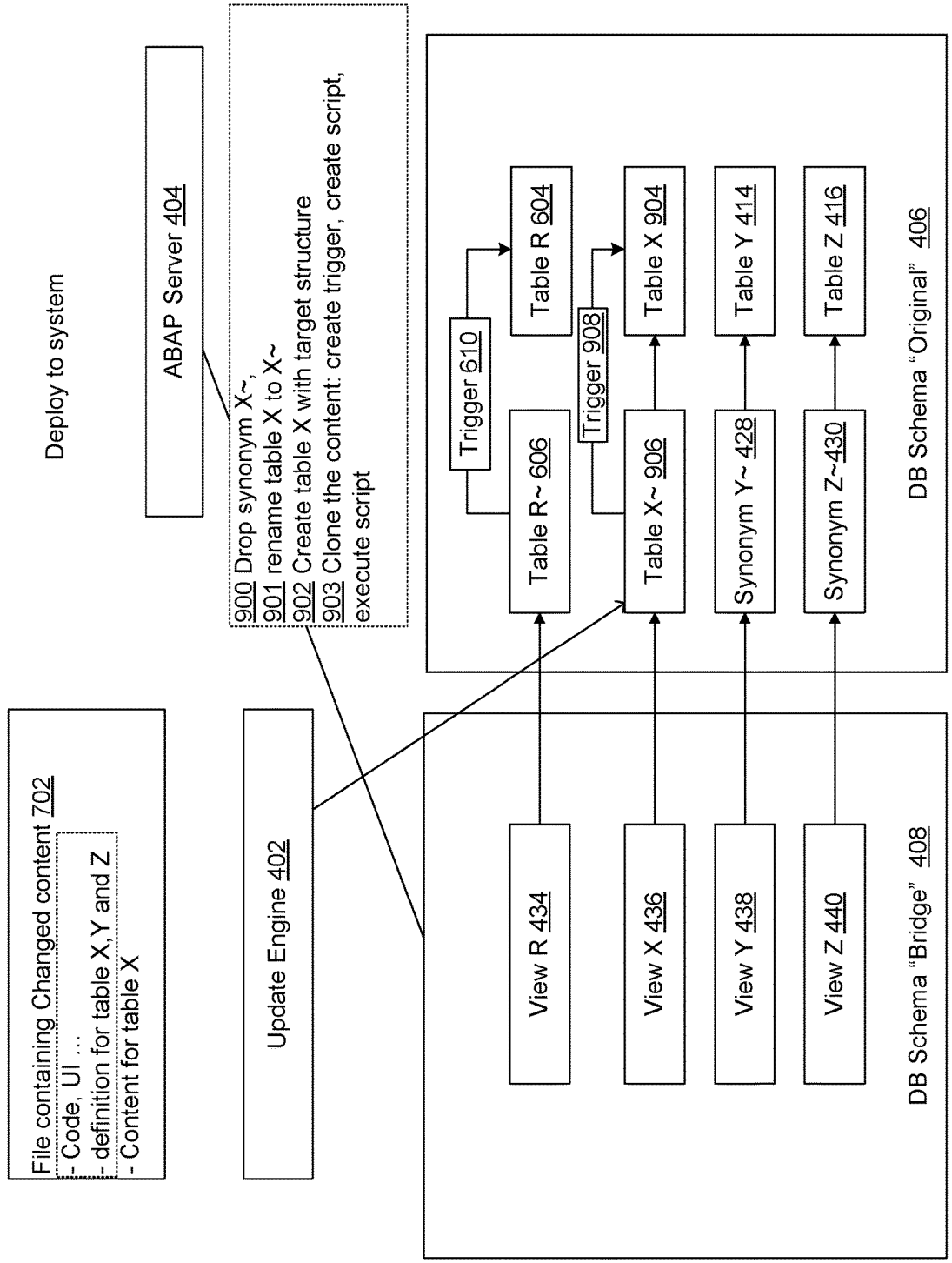
FIG. 9 is a block diagram illustrating continued operations associated with the exampled deployment of FIGS. 7 and 8.

FIG. 9 is a block diagram illustrating continued operations associated with the exampled deployment of FIGS. 7 and 8. Specifically, as shown in FIG. 9, the update engine 402 may proceed to execute the same and/or similar types of operations described above with respect to creating an appropriately named target table for the desired import. Specifically, continuing the example of FIGS. 7 and 8, as just referenced, it is assumed that the table X 412 will be updated with a new, target table. Accordingly, the update engine 402 may proceed to drop the synonym X~ 426 (900), and rename the table X 412 to table X~ 906 (901). The update engine 402 may then be configured to proceed to create the target table X 904 as including the desired target structure (902). The update engine 402 may then be configured to proceed to clone content from the table X~ 906 to the target table X 904 (903), including creating the trigger 908 to maintain synchronicity between the tables 906, 904.

In some implementations, the update engine 402 executes the copying/cloning including creating a script for accomplishing the copying tasks. Then, the copying may proceed by executing the created script.

Figure 10:
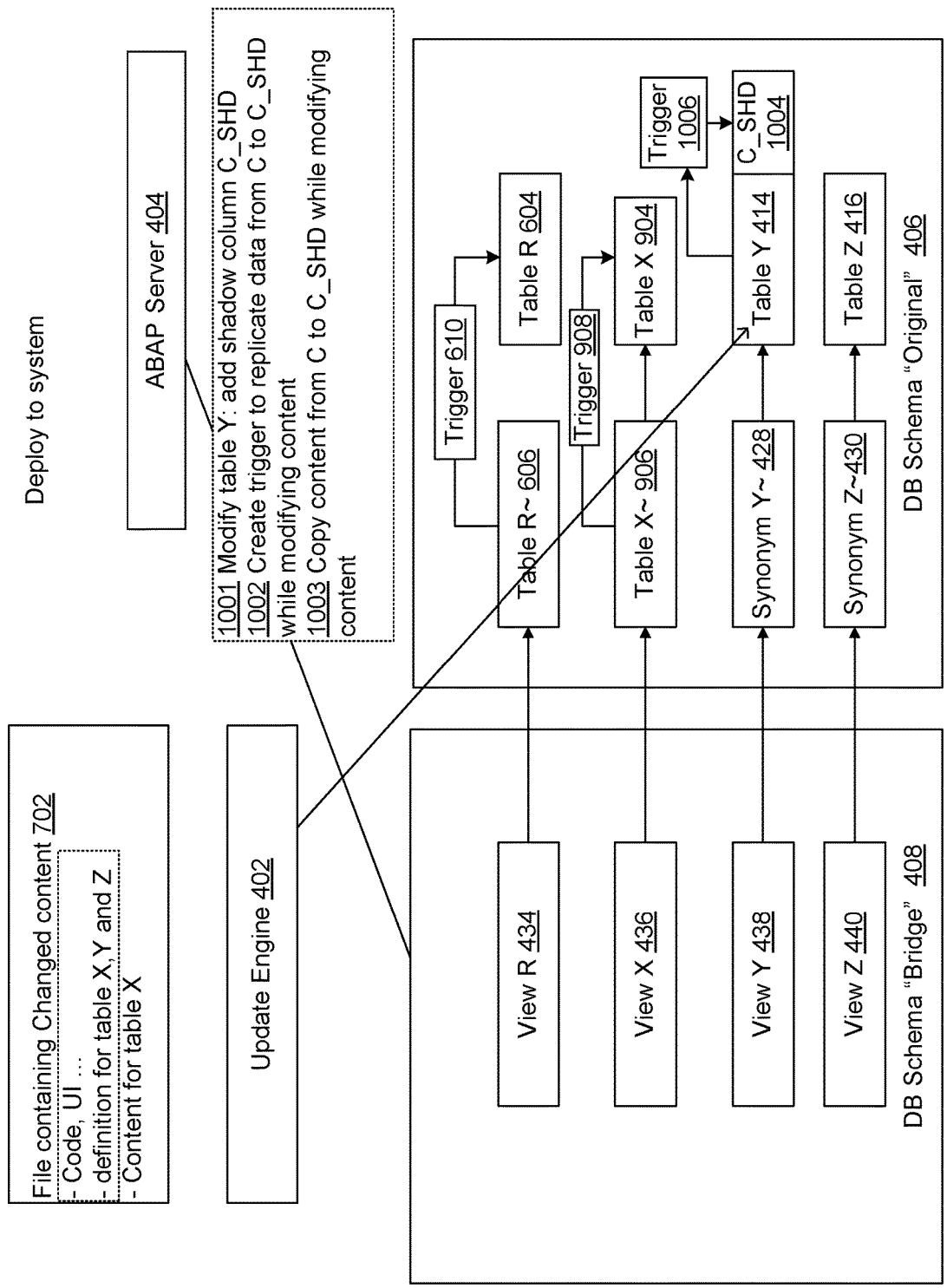
FIG. 10 is a block diagram illustrating further example operations of the example deployment of FIGS. 7-9, including creating a shadow field.

FIG. 10 is a block diagram illustrating further example operations of the example deployment of FIGS. 7-9. Specifically, as shown, and as referenced above, FIG. 10 illustrates example operations of the update engine 402 in executing a shadow field of Table 1, above.

As shown, the update engine 402 may be configured to modify the table Y 414 to add a shadow column C_SHD 1004 (1001). The update engine 402 may be further configured to create a trigger 1006 to replicate data from a corresponding column C to the newly-created shadow column C_SHD 1004, while modifying content (1002). In this way, content may be copied from the original column C to the shadow column C_SHD 1004 while modifying content (1003). As may be understood from the above description, the target column 1004 will be invisible to the executing application of the server 404, until after the import and deployment processes are complete.

More generally, for all tables characterized as receiving the action "shadow field," alterations will proceed. Specifically, for each field to add, the new field may be added with the original name. For each field to receive a type change, the field with the target data type and the shadow name is added "field_SHD." For each field where data is modified by a data migration, the field with the target data type and the shadow name may be created "field_SHD."

Figure 11:
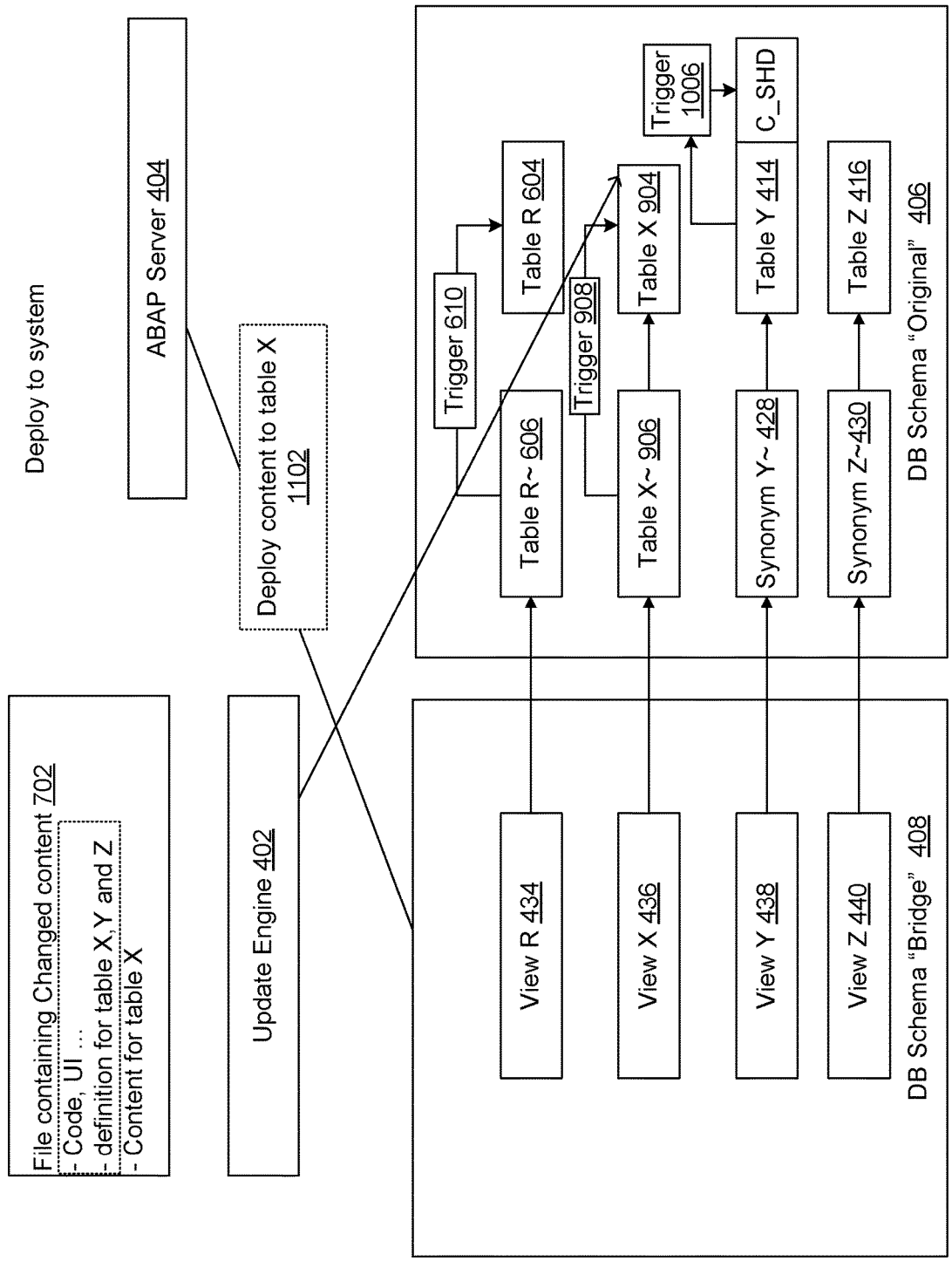
FIG. 11 is a block diagram illustrating further example operations of the deployment operations in the examples of FIGS. 7-10.

FIG. 11 is a block diagram illustrating further example operations of the deployment operations in the examples of FIGS. 7-10. In the example of FIG. 11, the update engine 402 is configured to deploy content to the table X904 (1102).

Figure 12:
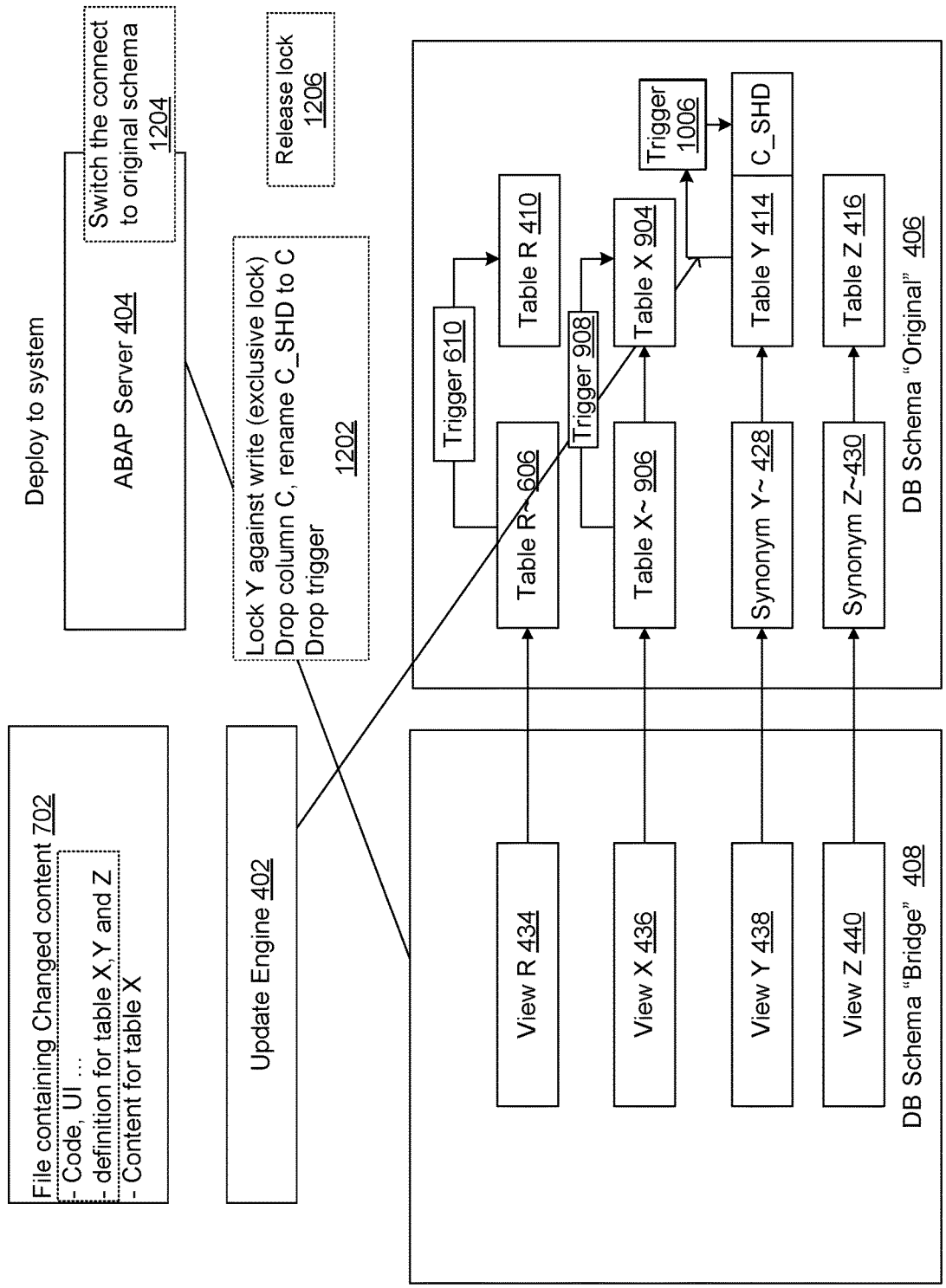
FIG. 12 is a block diagram illustrating final example operations of the example deployment operations of FIGS. 7-11.

FIG. 12 is a block diagram illustrating final example operations of the example deployment operations of FIGS. 7-11. As shown, FIG. 12 illustrates example operations with respect to the target column 1004.

Specifically, as shown, the table Y 414 may be locked against write operations (e.g., an exclusive lock), the original column C may be dropped, and the shadow column C_SHD 1004 may be renamed to the original name column C, at which point the trigger 1006 may be dropped (1202).

At this point, the update engine 402 may proceed to change the connection of the server 404 from the bridge schema 408 back to the original schema 406 (1204), and release any of the above-referenced database locks (1206). As already referenced, and as may be observed from the example of FIG. 12, the server 404 may then proceed to execute using the original schema 406, including using the original names of the various tables and columns thereof included therein.

Figure 13:
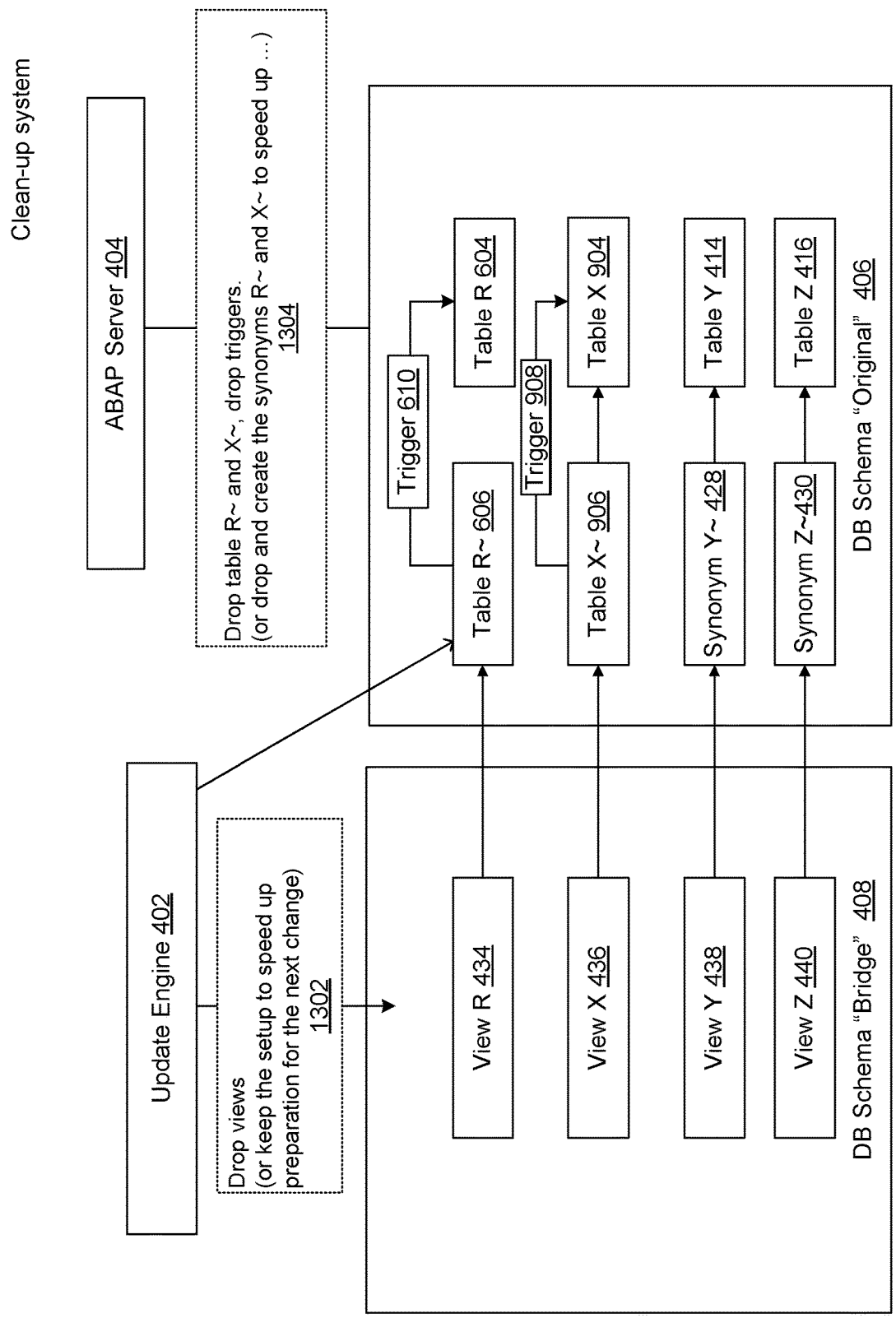
FIG. 13 is a block diagram illustrating cleanup operations associated with completion of the deployment operation of the examples of FIGS. 7-12.

FIG. 13 is a block diagram illustrating cleanup operations associated with completion of the deployment operation of the examples of FIGS. 7-12. Specifically, as shown, the update engine 402 may be configured to drop the various views of the bridge schema 408 (1302). The update engine 402 may be further configured to drop the tables R~ 606 and X~ 906, as well as dropping corresponding triggers 610 and 908 (1304).

In some example implementations, as illustrated in FIG. 13, steps may be taken to prepare the system for future potential update changes. For example, the various views of the bridge schema may be partially or completely maintained. Somewhat similarly, the synonyms R~ and X~ may be dropped and created, again as preemptive measures for preparing the system for future updates.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed, are configured to cause at least one computing device to:
   install an update engine on a server;
   wherein the update engine is configured to generate a bridge schema corresponding to an original schema of a database system, the original schema including a plurality of database tables and having a connection to an application server and being used by a software application executing on the application server;
   wherein the update engine is configured to generate, within the bridge schema, a plurality of bridge views corresponding to the plurality of database tables;
   wherein the update engine is configured to change the connection to the bridge schema and continue executing the software application using the plurality of bridge views;
   wherein the update engine is configured to generate create and delete statements for the plurality of bridge views;
   wherein the update engine is configured to receive a change file defining update changes to at least one original database table of the plurality of database tables;
   wherein the update engine is configured to synchronize content of the at least one original database table with a target table, the target table reflecting the update changes;
   wherein the update engine is configured to change the connection back to the original schema of the database system and continue executing the software application, using the plurality of database tables and including the target table; and
   wherein the bridge schema and the create and delete statements are generated prior to receipt of the change file.

2. The computer program product of claim 1, wherein the update changes include at least one structural change to the at least one original database table, as reflected in the target table.

3. The computer program product of claim 1, wherein the at least one original database table has an original name, and wherein the instructions, when executed, are further configured to:
   switch the original name of the at least one original database table to a new name; and
   provide the target table with the original name.

4. The computer program product of claim 3, wherein the instructions, when executed, are further configured to:
   drop a corresponding view of the plurality of bridge views that corresponds to the at least one original database table and is created using the original name; and
   create an updated view on the at least one original database table, using the new name.

5. The computer program product of claim 1, wherein the instructions, when executed, are further configured to:
   create a database synonym for the at least one original database table;
   create a view of the database synonym in the plurality of bridge views;
   rename the at least one original database table to match the database synonym; and
   provide the target table with an original name of the at least one original database table.

6. The computer program product of claim 1, wherein the instructions, when executed, are further configured to synchronize the content of the at least one original database table with the target table, including:
   creating a database trigger between the at least one original database table and the target table, the database trigger configured to update corresponding content of the target table in response to content changes received at the at least one original database table through a corresponding view of the plurality of bridge views.

7. The computer program product of claim 1, wherein the update changes include an added database field within the target table, as compared to the at least one original database table.

8. The computer program product of claim 7, wherein the instructions, when executed, are further configured to synchronize the content of the at least one original database table with the target table, including:
   copying the content of the at least one original database table to the target table.

9. The computer program product of claim 7, wherein the instructions, when executed, are further configured to synchronize the content of the at least one original database table with the target table, including:
   creating a database trigger between the at least one original database table and the added database field of the target table.

10. The computer program product of claim 1, wherein the instructions, when executed, are further configured to receive the change file, including:
    analyzing the change file to thereby identify the at least one original database table from among the plurality of database tables, based on the update changes being requested.

11. A server comprising:
    at least one processor; and
    a non-transitory computer readable storage medium configured to store instructions executable by the at least one processor, the server including:
    an update engine pre-installed on the server and configured to receive a change file including update changes to be executed with respect to a plurality of database tables storing data used by a software application during execution of the software application, wherein the update engine includes:
    a schema generator configured to generate a bridge schema corresponding to an original schema of the plurality of database tables prior to receipt of the change file,
    a view generator configured to generate a plurality of bridge views within the bridge schema prior to receipt of the change file,
    a shadow table generator configured to generate a shadow table within the original schema prior to generating the bridge schema and the plurality of bridge views, wherein content of at least one database table of the plurality of database tables is copied to the shadow table;

a file analyzer configured to analyze the change file and identify the update changes, and an import engine configured to update the shadow table to create a target table reflecting the update changes;

wherein the update engine is further configured to generate create and delete statements for the plurality of bridge views prior to receipt of the change file.

12. The server of claim 11, wherein the original schema has a connection to the server and is used by the software application, and the update engine includes a transition handler configured to change the connection to the bridge schema and continue executing the software application using the plurality of bridge views until the update changes have been imported.

13. The server of claim 12, wherein the update engine is further configured to synchronize current content of the at least one database table with the target table during the execution of the software application and during import of the update changes, and wherein after completion of the import of the update changes, the transition handler is further configured to change the connection back to the original schema of a database system and continue executing the software application, using the plurality of database tables and including the target table.

14. The server of claim 13, wherein the target table is provided with an original name of the at least one database table.

15. The server of claim 13, wherein the update engine is configured to synchronize the current content of the at least one database table with the target table during the import of the update changes, including installing a database trigger between the at least one database table and the target table.

16. A method comprising:

generating a bridge schema corresponding to an original schema of a database system, the original schema including a plurality of database tables and having a connection to an application server and being used by a software application executing on the application server;

generating, within the bridge schema, a plurality of bridge views corresponding to the plurality of database tables;

generating create and delete statements for the plurality of bridge views;

generating a shadow table within the original schema, wherein content of at least one database table of the plurality of database tables is copied to the shadow table;

changing the connection to the bridge schema and continue executing the software application using the plurality of bridge views;

receiving a change file defining update changes to at least one original database table of the plurality of database tables;

synchronizing content of the at least one original database table with a target table, the target table reflecting the update changes; and changing the connection back to the original schema of the database system and continue executing the software application, using the plurality of database tables and including the target table;

wherein the bridge schema and the create and delete statements are generated prior to receipt of the change file by an update engine pre-installed on the application server, and wherein the shadow table is generated prior to generating the bridge schema and the plurality of bridge views; and the method further comprises:

after completing the update changes, reverting back, by the update engine to a ready condition for a subsequent update; and initiating a subsequent update.

17. The method of claim 16, further comprising:

switching an original name of the at least one original database table to a new name; and providing the target table with the original name.

18. The method of claim 16, wherein the synchronizing content includes:

creating a database trigger between the at least one original database table and the target table, the database trigger configured to update corresponding content of the target table in response to content changes received at the at least one original database table through a corresponding view of the plurality of bridge views.

19. The method of claim 16, wherein receiving the change file includes:

analyzing the change file to thereby identify the at least one original database table from among the plurality of database tables, based on the update changes being requested.

20. The method of claim 16, wherein the at least one database table comprises a code repository table.

* * * * *